(12) United States Patent
Kim et al.

(10) Patent No.: US 7,532,294 B2
(45) Date of Patent: May 12, 2009

(54) DISPLAY APPARATUS AND METHOD OF MANUFACTURING THE SAME

(75) Inventors: Hyun-Wuk Kim, Yongin-si (KR); Chang-Hun Lee, Yongin-si (KR); Hak-Sun Chang, Yongin-si (KR); Hee-Wook Do, Suwon-si (JP); Jae-Jin Lyu, Gwangju-si (KR); Yoon-Sung Um, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 345 days.

(21) Appl. No.: 11/330,943

(22) Filed: Jan. 12, 2006

(65) Prior Publication Data

US 2006/0176434 A1 Aug. 10, 2006

(30) Foreign Application Priority Data

Feb. 7, 2005 (KR) .................. 10-2005-0011271
Apr. 19, 2005 (KR) .................. 10-2005-0032414

(51) Int. Cl.
G02F 1/1343 (2006.01)
(52) U.S. Cl. ............... 349/141; 349/139; 349/142; 349/144; 349/145; 349/146
(58) Field of Classification Search ............... 349/141, 349/139, 142, 144–146
See application file for complete search history.

(56) References Cited

U.S. PATENT DOCUMENTS

| 7,251,004 | B2 * | 7/2007 | Kim et al. | 349/141 |
| 7,304,707 | B2 * | 12/2007 | Son | 349/141 |
| 2004/0008313 | A1 * | 1/2004 | Park et al. | 349/141 |

* cited by examiner

*Primary Examiner*—Charlie Peng
*Assistant Examiner*—Jerry Blevins
(74) *Attorney, Agent, or Firm*—F. Chau & Associates, LLC

(57) ABSTRACT

A display apparatus comprises a plurality of pixel areas, each defined by gate lines and data lines, wherein the data lines are arranged with the gate lines forming an angular relationship with the data lines, and a plurality of pixel electrodes formed in the pixel areas and configured to be essentially parallel with the arrangement of the gate lines.

23 Claims, 13 Drawing Sheets

DISPLAY APPARATUS AND METHOD OF MANUFACTURING THE SAME

CROSS-REFERENCE TO RELATED APPLICATIONS

This application claims priority to Korean Patent Application No. 2005-11271 filed on Feb. 7, 2005 and Korean Patent Application No. 2005-32414 filed on Apr. 19, 2005, the contents of which are herein incorporated by reference in their entireties.

BACKGROUND OF THE INVENTION

1. Technical Field

The present disclosure relates to a display apparatus and a method of manufacturing the display apparatus, and more particularly, to a display apparatus capable of improving display quality and a method of manufacturing the display apparatus.

2. Description of the Related Art

A liquid crystal display apparatus includes a first electrode, a second electrode and a liquid crystal layer. The first electrode is spaced apart from the second electrode to form an electric field. The first and second electrodes are formed on a substrate, or alternatively on two substrates. The liquid crystal layer is formed between the first and second electrodes.

When a voltage is applied to the first and second electrodes, the electric field is formed between the first and second electrodes. A plurality of liquid crystal molecules of the liquid crystal layer is aligned in response to the electric field. The liquid crystal layer controls a transmittance of light supplied to the liquid crystal display apparatus, and the liquid crystal display apparatus displays an image using the light.

To improve a viewing angle of an LCD, a patterned vertical alignment (PVA) mode, a multi-domain vertical alignment (MVA) mode, or an in-plane switching (IPS) mode can be used.

A PVA mode liquid crystal display apparatus includes a transparent electrode having an opened pattern to form a plurality of domains of the liquid crystal layer in a pixel region. The liquid crystal molecules formed in the domains are aligned to a direction different from each other, thereby improving the viewing angle.

In the PVA mode liquid crystal display apparatus, the transparent electrode has a V shape to improve transmittance characteristics, and a data line forms a zigzag pattern. The data line forming the zigzag pattern should coincide with the transparent electrode having the V shape. When a data line forms the zigzag pattern, the length and the resistance of the data line increase, thereby resulting in a transmission delay of a data signal.

SUMMARY OF THE INVENTION

Embodiments of the present invention provide a display apparatus capable of minimizing a transmission delay of a data signal, and a method of manufacturing the display apparatus.

According to an embodiment of the present invention, a display apparatus comprises a plurality of pixel areas, each defined by gate lines and data lines, wherein the data lines are arranged with the gate lines forming an angular relationship with the data lines, and a plurality of pixel electrodes formed in the pixel areas and configured to be essentially parallel with the arrangement of the gate lines. The gate lines form a zigzag pattern of which a plurality of V shapes are formed.

According to another embodiment of the present invention, a method of manufacturing a display apparatus comprises forming a plurality of gate lines on a substrate, wherein two adjacent gate lines are electrically connected to each other, forming a plurality of data lines extended longitudinally such that the data lines form an angular relationship with the gate lines, and forming a plurality of pixel electrodes in a plurality of pixel areas coincide with the gate lines and the data lines, wherein a portion of each pixel electrode is angular shaped and a longitudinally extended data line is disposed along the angular shaped portion of each pixel electrode.

According to embodiments of the present invention, the data lines that apply a data signal to the pixel electrode having a V shape or an M shape may have the straight-line shape, so that the data lines may have the shortened length in comparison with a zigzag shape of the data lines, thereby preventing the delay of the data signal through the data lines.

BRIEF DESCRIPTION OF THE DRAWINGS

Preferred embodiments of the present disclosure can be understood in more detail from the following description taken in conjunction with the accompanying drawings wherein.

DETAILED DESCRIPTION OF THE PREFERRED EMBODIMENTS

Preferred embodiments of the present invention will be described below in more detail with reference to the accompanying drawings. The present invention may be embodied in many different forms and should not be construed as limited to the embodiments set forth herein.

Figure 1:
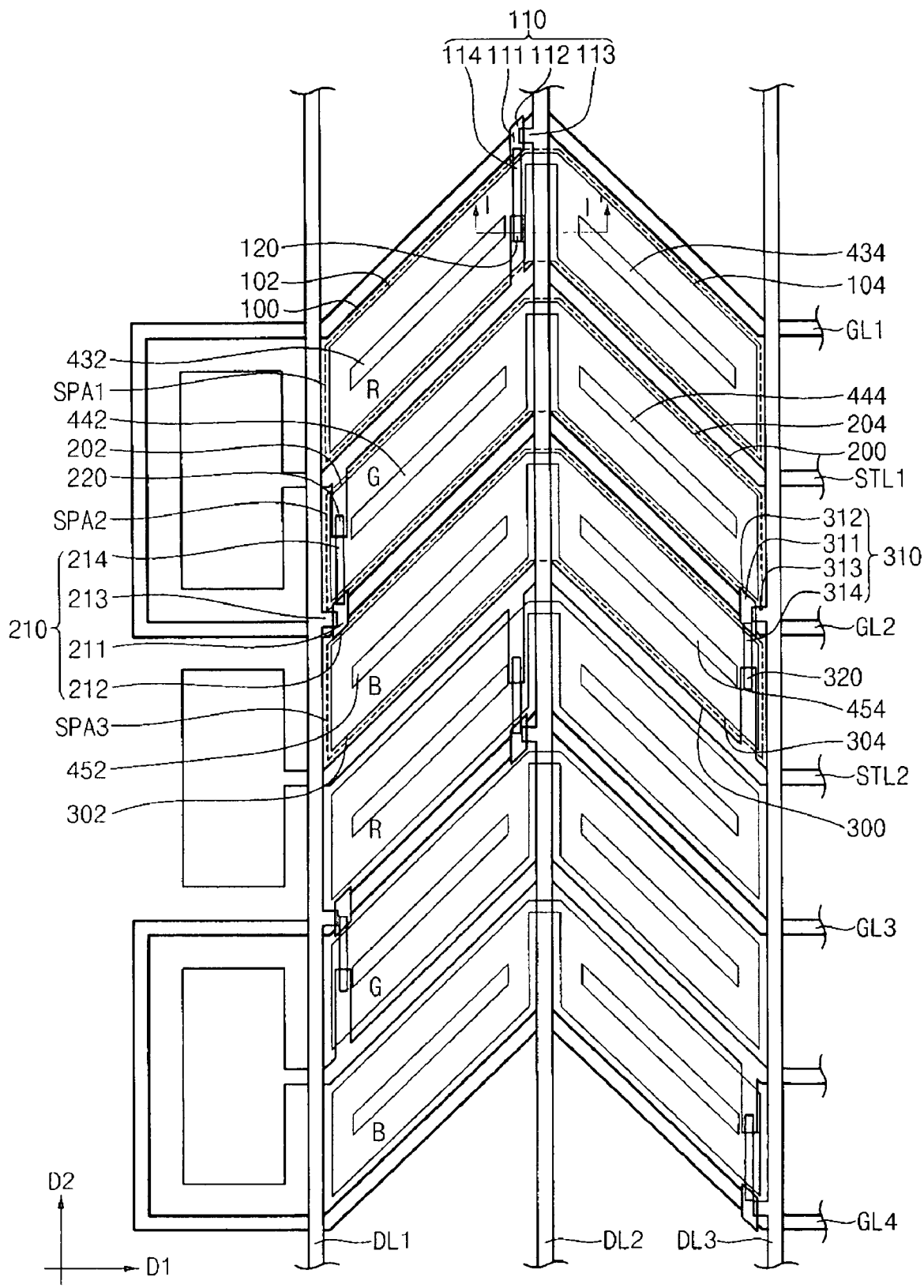
FIG. 1 is a plan view illustrating a display apparatus according to an exemplary embodiment of the present invention.
Figure 2:
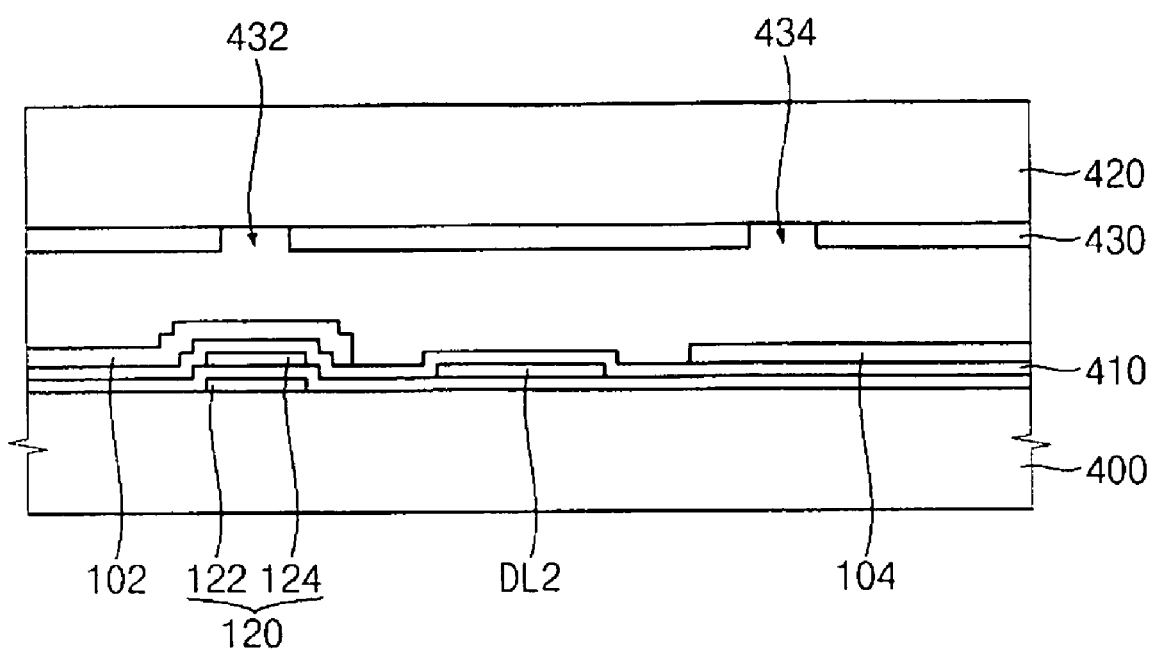
FIG. 2 is a cross-sectional view taken along the line I-I' in FIG. 1.

FIG. 1 is a plan view illustrating a display apparatus according to an exemplary embodiment of the present invention. FIG. 2 is a cross-sectional view taken along the line I-I' in FIG. 1. In an embodiment of the present invention, four gate lines and three data lines are used. The number of gate and data lines can be varied.

Referring to FIG. 1, a display apparatus includes a plurality of gate lines GL1, GL2, GL3 and GL4 extended to a first direction D1 and a plurality of data lines DL1, DL2 and DL3 extended to a second direction D2, so that the gate lines GL1, GL2, GL3 and GL4 intersect with the data lines DL1, DL2 and DL3.

The gate lines GL1, GL2, GL3 and GL4 and the data lines DL1, DL2 and DL3 define pixel areas, wherein each pixel area PA includes a first sub pixel area SPA1, a second sub pixel area SPA2 and a third sub pixel area SPA3. The gate lines GL1, GL2, GL3 and GL4 are bent to the second direction D2 such that the pixel area PA has a V shape. The gate lines GL1, GL2, GL3 and GL4 have a zigzag shape of which a plurality of V shapes are arranged one after another in the first direction D1. According to an embodiment of the present invention, the gate lines GL1, GL2, GL3 and GL4 may have a bending angle of about ninety degrees. Two adjacent gate lines are electrically connected to each other through ends of the two gate lines. That is, an end of the first gate line GL1 is electrically connected to an end of the second gate line GL2, and an end of the third gate line GL3 is electrically connected to an end of the fourth gate line GL4. Thus, the first and second gate lines GL1 and GL2 receive a same gate signal, and also the third and fourth gate lines GL3 and GL4 receive a same gate signal.

The data lines DL1, DL2 and DL3 are extended longitudinally in the second direction D2, and formed at both end portions and a center portion of the pixel area PA. That is, the first data line DL1 is formed at a first end portion of the pixel area PA, the second data line DL2 is formed at the center portion of the pixel area PA, and the third line DL3 is formed at a second end portion of the pixel area PA.

The first sub pixel area SPA1, the second sub pixel area SPA2 and the third sub pixel area SPA3 are sequentially arranged in the second direction D2. The first sub pixel area SPA1 is an area on which a red color is displayed in response to a data signal applied through the second data line DL2. The second sub pixel area SPA2 is an area on which a green color is displayed in response to the data signal applied through the first data line DL1. The third sub pixel area SPA3 is an area on which a blue color is displayed in response to the data signal applied through the third data line DL3.

A first pixel electrode 100 and a first thin film transistor (TFT) 110 are formed in the first sub pixel area SPA1. The first pixel electrode 100 has a V shape corresponding to the gate lines GL1, GL2, GL3 and GL4, of which a center portion of the first pixel electrode 100 is bent to the second direction D2.

The first pixel electrode 100 has a bilateral symmetrical shape with reference to the second data line DL2. That is, the first pixel electrode 100 includes a (1-1)-th electrode 102 formed at a left side of the second data line DL2 and a (1-2)-th electrode 104 formed at a right side of the second data line DL2. In an area adjacent to the first gate line GL1, the (1-1)-th electrode 102 is partially electrically connected to the (1-2)-th electrode 104.

As shown in FIG. 2, the first pixel electrode 100 formed on a display substrate 400 is removed from an area overlapped with the second data line DL2, so that the first pixel electrode 100 may include the (1-1)-th electrode 102 and the (1-2)-th electrode 104.

A passivation layer 410 is formed between the second data line DL2 and the (1-1)-th electrode 102 and between the second data line DL2 and the (1-2)-th electrode 104. Since the thickness of the passivation layer 410 is thin, a parasitic capacitance occurs between the second data line DL2 and the (1-1)-th electrode 102 and between the second data line DL2 and the (1-2)-th electrode 104. Thus, in an embodiment of the present invention, the (1-1)-th electrode 102 is separated from the (1-2)-th electrode 104 and partially connected to the (1-2)-th electrode 104, thereby reducing the parasitic capacitance.

Referring to FIG. 1, the first TFT 110 includes a first gate electrode 111, a first active pattern 112, a first source electrode 113 and a first drain electrode 114. The first active pattern 112 is partially overlapped with the first gate line GL1, and the first source electrode 113 is protruded from the second data line DL2. The first gate electrode 111 is an area of which the first active pattern 112 is overlapped with the first gate line GL1. The first drain electrode 114 is spaced apart from the first source electrode 113 and electrically connected to the (1-1)-th electrode 102 of the first pixel electrode 100 through a contact hole (not shown).

The first TFT 110 is operated in response to the gate signal applied from the first gate line GL1, so that the data signal is applied to the (1-1)-th electrode 102 and the (1-2)-th electrode 104 through the second data line DL2.

A second pixel electrode 200 and a second TFT 210 are formed in the second sub pixel area SPA2. The second pixel electrode 200 has a V shape corresponding to the gate lines GL1, GL2, GL3 and GL4, of which a center portion of the second pixel electrode 200 is bent to the second direction D2. The second pixel electrode 200 includes a (2-1)-th electrode 202 and a (2-2)-th electrode 204. The (2-1)-th electrode 202 and the (2-2)-th electrode 204 have the same function and structure as those of the (1-1)-th electrode 102 and the (1-2)-th electrode 104.

A second TFT 210 includes a second gate electrode 211, a second active pattern 212, a second source electrode 213 and a second drain electrode 214. The second active pattern 212 is partially overlapped with the second gate line GL2, and the second source electrode 213 is protruded from the first data line DL1. The second gate electrode 211 is an area of which the second active pattern 212 is overlapped with the second gate line GL2. The second drain electrode 214 is spaced apart from the second source electrode 213 and electrically connected to the (2-1)-th electrode 202 of the second pixel electrode 200 through a contact hole (not shown).

The second TFT 210 performs a switching operation in response to the gate signal applied from the second gate line GL2, so that the data signal is applied to the (2-1)-th electrode 202 and the (2-2)-th electrode 204 through the first data line DL1. The gate signal from the second gate line GL2 is identical with the gate signal from the first gate line GL1 since the second gate line GL2 is electrically connected to the first gate line GL1.

A third pixel electrode 300 and a third TFT 310 are formed in a third sub pixel area SPA3. The third pixel electrode 300 has a V shape corresponding to the gate lines GL1, GL2, GL3 and GL4, of which a center portion of the third pixel electrode 300 is bent to the second direction D2. The third pixel electrode 300 includes a (3-1)-th electrode 302 and a (3-2)-th electrode 304. The (3-1)-th electrode 302 and the (3-2)-th electrode 304 have the same function and structure as those of the (1-1)-th electrode 102 and the (1-2)-th electrode 104 of the first pixel electrode 100.

The third TFT 310 includes a third gate electrode 311, a third active pattern 312, a third source electrode 313 and a third drain electrode 314. The third active pattern 312 is partially overlapped with the second gate line GL2, and the third source electrode 313 is protruded from the third data line DL3. The third gate electrode 311 is an area of which the third active pattern 312 is overlapped with the second gate line GL2. The third drain electrode 314 is spaced apart from the third source electrode 313 and electrically connected to the (3-1)-th electrode 304 of the third pixel electrode 300 through a contact hole (not shown).

The third TFT 310 performs a switching operation in response to the gate signal applied from the second gate line GL2, so that the data signal is applied to the (3-1)-th electrode 302 and the (3-2)-th electrode 304 through the third data line DL3.

A first storage line STL1 and a second storage line STL2 are formed in the pixel area PA. The first storage line STL1 is formed between the first sub pixel area SPA1 and the second sub pixel area SPA2 and has the same shape as that of the first gate line GL1. The second storage line STL2 is formed between the third sub pixel area SPA3 and a next pixel area and has a same shape as that of the second gate line GL2.

Further, a first storage capacitor 120 is formed in the first sub pixel area SPA1, a second storage capacitor 220 is formed in the second sub pixel area SPA2, and a third storage capacitor 320 is formed in the third sub pixel area SPA3.

The first storage capacitor 120 is an area where an electrode extended from the first storage line STL1 and the first drain electrode 114 are partially overlapped with each other. The second storage capacitor 220 is an area where the electrode extended from the first storage line STL1 and the second drain electrode 214 are partially overlapped with each other. The third storage capacitor 320 is an area where the electrode extended from the second storage line STL2 and the third drain electrode 314 are partially overlapped with each other.

As shown in FIG. 2, the display apparatus further comprises a common electrode 430. The common electrode 430 is formed on an opposite substrate 420 to the display substrate 400 to allow the common electrode 430 to face the first, second and third pixel electrodes 100, 200 and 300. The common electrode 430 corresponding to the first sub pixel area SPA1 is partially removed to form a (1-1)-th opening 432 and a (1-2)-th opening 434. The (1-1)-th opening 432 is formed at the center portion of the (1-1)-th electrode 102 and h as a corresponding shape to the (1-1)-th electrode 102. The (1-2)-th opening 434 is formed at the center portion of the (1-2)-th electrode 104 and has a corresponding shape to the (1-2)-th electrode 104. Thus, the first sub pixel area SPA1 is divided into four domains by the (1-1)-th opening 432 and the (1-2)-th opening 434.

The common electrode 430 corresponding to the second sub pixel area SPA2 is partially removed to form a (2-1)-th opening 442 and a (2-2)-th opening 444. The (2-1)-th opening 442 is formed at the center portion of the (2-1)-th electrode 202 and has a corresponding shape to the (2-1)-th electrode 202. The (2-2)-th opening 444 is formed at the center portion of the (2-2)-th electrode 204 and has a corresponding shape to the (2-2)-th electrode 204. Thus, the second sub pixel area SPA2 is divided into four domains by the (2-1)-th opening 442 and the (2-2)-th opening 444.

The common electrode 430 corresponding to the third sub pixel area SPA3 is partially removed to form a (3-1)-th opening 452 and a (3-2)-th opening 454. The (3-1)-th opening 452 is formed at the center portion of the (3-1)-th electrode 302 and has a corresponding shape to the (3-1)-th electrode 302. The (3-2)-th opening 454 is formed at the center portion of the (3-2)-th electrode 304 and h as a corresponding shape to the (3-2)-th electrode 304. Thus, the third sub pixel area SPA3 is divided into four domains by the (3-1)-th opening 452 and the (3-2)-th opening 454.

Therefore, the liquid crystal molecules in the first, second and third pixel areas SPA1, SPA2 and SPA3 are vertically aligned in different directions according to the domains, thereby improving a response speed of the display apparatus.

Also, the display apparatus may have an enhanced opening ratio since distances can be increased between the pixel electrodes 100, 200 and 300 and the openings 432, 434, 442, 444, 452 and 454, respectively.

In an embodiment of the present invention, the gate lines GL1, GL2, GL3 and GL4 have the zigzag shape, and the data lines DL1, DL2 and DL3 have a straight-line shape. The first, second and third pixel electrodes 100, 200 and 300 are partially removed from the areas where the data lines DL1, DL2 and DL3 are overlapped with the first, second and third pixel electrodes 100, 200 and 300. Thus, lengths of the data lines DL1, DL2 and DL3 may be reduced, and the parasitic capacitance between the data lines DL1, DL2 and DL3 and the first, second and third pixel electrodes 100, 200 and 300 may be reduced.

Figure 3:
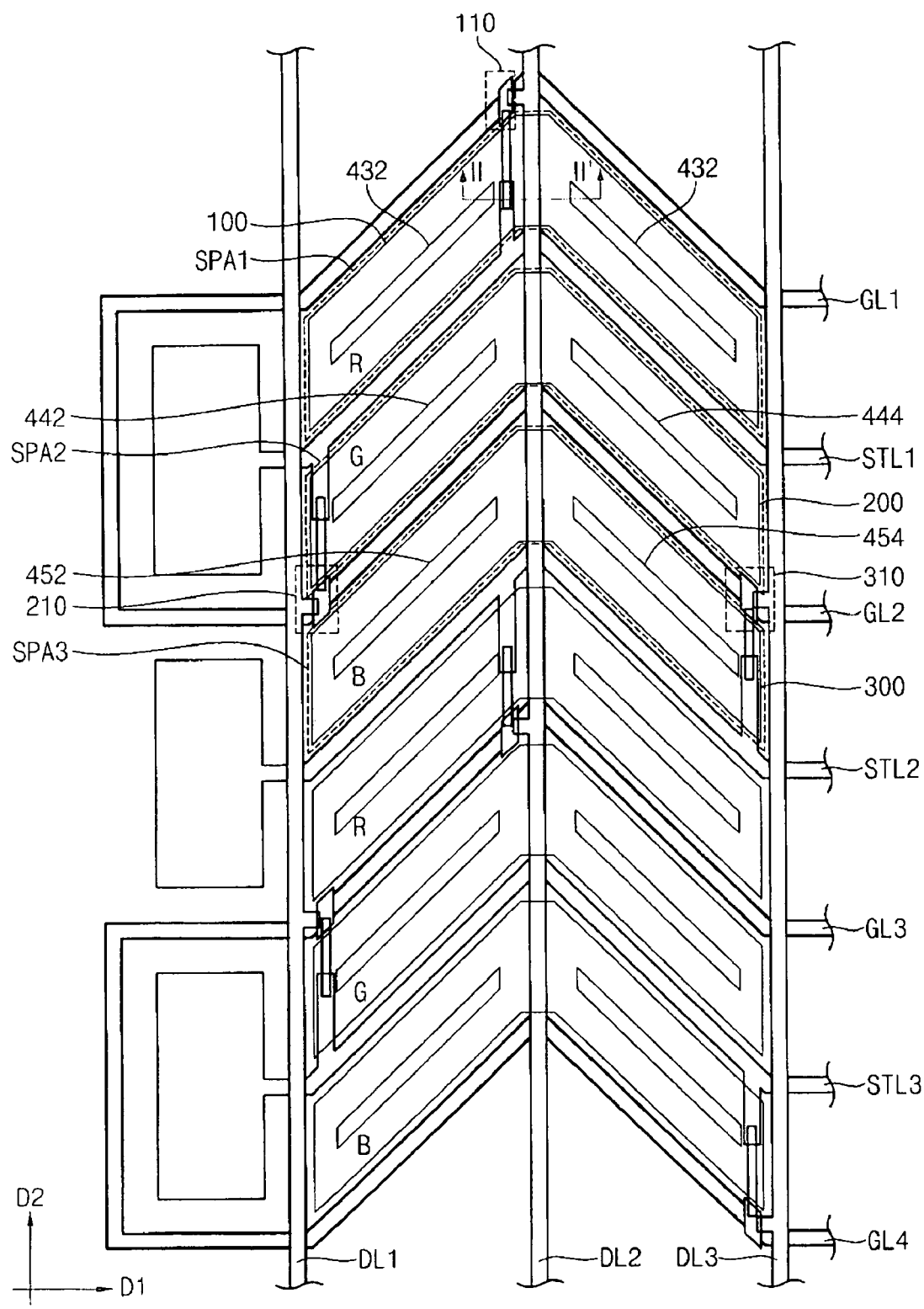
FIG. 3 is a plan view illustrating a display apparatus according to another exemplary embodiment of the present invention.
Figure 4:
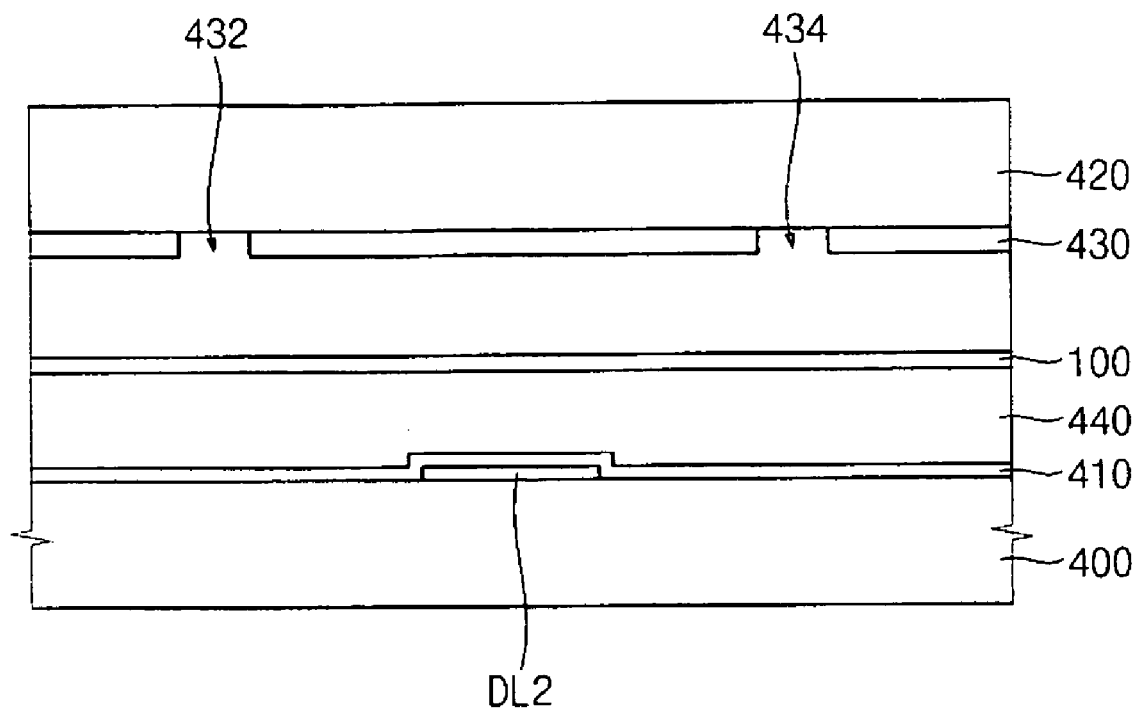
FIG. 4 is a cross-sectional view taken along the line II-II' in FIG. 3.

FIG. 3 is a plan view illustrating a display apparatus according to another exemplary embodiment of the present invention. FIG. 4 is a cross-sectional view taken along the line II-II' in FIG. 3.

Referring to FIG. 3, the data lines DL1, DL2 and DL3 are extended longitudinally in the second direction D2, and formed at both end portions and a center portion of the pixel area PA. That is, the first data line DL1 is formed at a first end portion of the pixel area PA, the second data line DL2 is formed at the center portion of the pixel area PA, and the third line DL3 is formed at a second end portion of the pixel area PA.

The pixel area PA includes a first sub pixel area SPA1, a second sub pixel area SPA2 and a third sub pixel area SPA3 sequentially arranged in the second direction D2. A first pixel electrode 100 is formed in the first sub pixel area SPA1, a second pixel electrode 200 is formed in the second sub pixel area SPA2, and a third pixel electrode 300 is formed in the third sub pixel area SPA3.

Each of the first, second and third pixel electrodes 100, 200 and 300 has a bilateral symmetrical shape with reference to the second data line DL2. Also, the first, second and third pixel electrodes 100, 200 and 300 are not removed from an area where the first, second and third pixel electrodes 100, 200 and 300 are overlapped with the second data line DL2.

As shown in FIG. 4, a passivation layer 410 and an organic layer 440 are sequentially formed on a display substrate 400 on which the second data line DL2 is formed. In an embodiment of the present invention, the organic layer 440 is thicker than the passivation layer 410. Thus, although the first, second and third pixel electrodes 100, 200 and 300 are not removed from the overlapped areas, the parasitic capacitance between the second data line DL2 and the first, second and third pixel electrodes 100, 200 and 300 may be reduced due to the organic layer 440.

Figure 5:
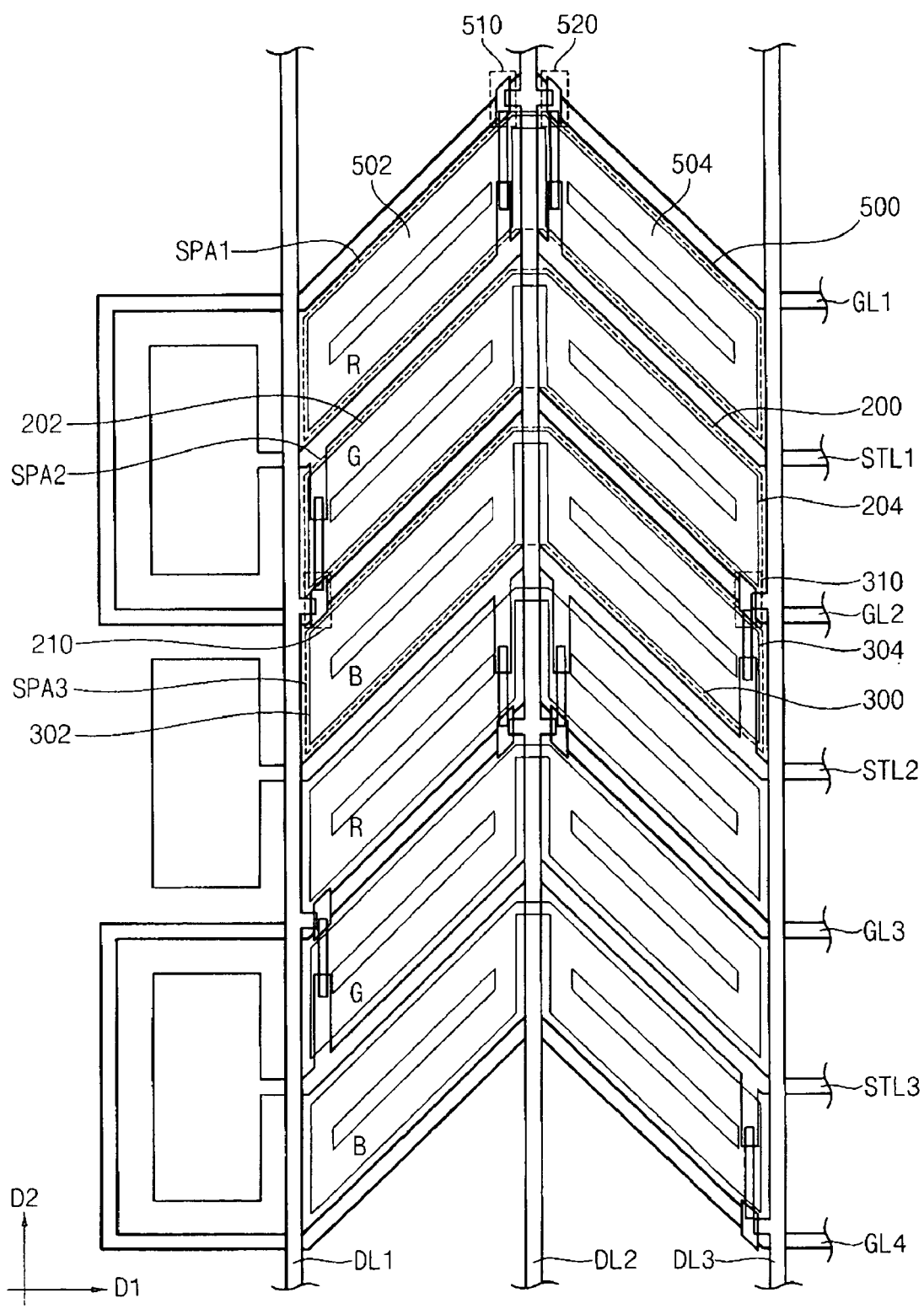
FIG. 5 is a plan view illustrating a display apparatus according to another exemplary embodiment of the present invention.

FIG. 5 is a plan view illustrating a display apparatus according to another exemplary embodiment of the present invention.

Referring to FIG. 5, a first pixel electrode 500 having a (1-1)-th electrode 502 and a (1-2)-th electrode 504 is formed in the first sub pixel area SPA1. The (1-1)-th electrode 502 is formed at a left side of the second data line DL2 and a (1-2)-th electrode 504 formed at a right side of the second data line DL2. The (1-1)-th electrode 502 is separated from the (1-2)-th electrode 504. Thus, a (1-1)-th TFT 510 applying a data signal to the (1-1)-th electrode 502 and a (1-2)-th TFT 520 applying the data signal to the (1-2) electrode 504 are formed in the first sub pixel area SPA1. In an embodiment of the present invention, the (1-1)-th TFT 510 and the (1-2)-th TFT 520 have the same structure and function as those of the first TFT 110.

A second pixel electrode 200 having a (2-1)-th electrode 202 and a (2-2)-th electrode 204 is formed in the second sub pixel area SPA2, and a third pixel electrode 300 having a (3-1)-th electrode 302 and a (3-2)-th electrode 304 is formed in the third sub pixel area SPA3. The (2-1)-th electrode 202 is partially connected to the (2-2)-th electrode 204, and the (3-1)-th electrode 302 is partially connected to the (3-2)-th electrode 304. Thus, a second TFT 210 is formed in the second sub pixel area SPA2, and a third TFT 310 is formed in the third sub pixel area SPA3.

In an embodiment of the present invention, the (2-1)-th electrode 202 and the (2-2)-th electrode 204 of the second pixel electrode 200 may be separated from each other, and the (3-1)-th electrode 302 and the (3-2)-th electrode 304 of the third pixel electrode 300 may be separated from each other. When the (2-1)-th electrode 202 is separated from the (2-2)-th electrode 204 and the (3-1)-th electrode 302 is separated from the (3-2)-th electrode 304, each of the second and third pixel electrodes 200 and 300 is electrically connected to two TFTs to apply the data signal to the separated electrodes.

Figure 6:
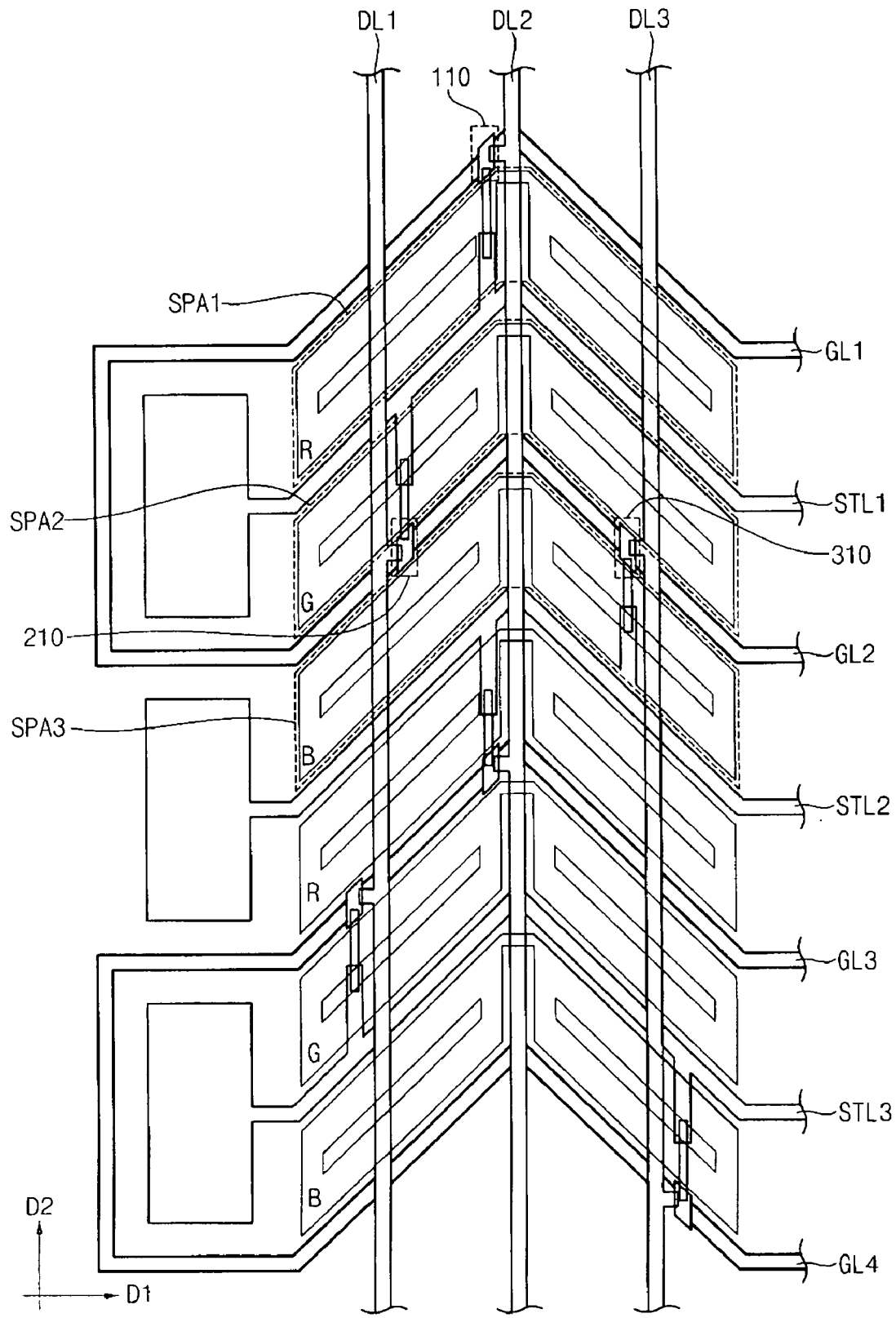
FIG. 6 is a plan view illustrating a display apparatus according to another exemplary embodiment of the present invention.

FIG. 6 is a plan view illustrating a display apparatus according to another exemplary embodiment of the present invention.

Referring to FIG. 6, according to an embodiment of the present invention, the gate lines GL1, GL2, GL3 and GL4 have a bending angle of about ninety degrees. Two adjacent gate lines are electrically connected to each other through ends of the two gate lines. That is, an end of the first gate line GL1 is electrically connected to an end of the second gate line GL2, and an end of the third gate line GL3 is electrically connected to an end of the fourth gate line GL4. Thus, the first and second gate lines GL1 and GL2 receive a same gate signal, and also the third and fourth gate lines GL3 and GL4 receive a same gate signal.

The data lines DL1, DL2 and DL3 are extended longitudinally in the second direction D2, and spaced apart from each other by a predetermined distance. That is, the second data line DL2 is formed at the center portion of the pixel area PA, the first data line DL1 is formed at a center portion between a first end portion of the pixel area PA and the second data line DL2, and the third line DL3 is formed at a center portion between a second end portion of the pixel area PA and the second data line DL2.

As described above, the parasitic capacitance between the data lines in adjacent pixel areas may be reduced since the data lines DL1, DL2 and DL3 are substantially regularly spaced apart from each other in the pixel area PA. Alternatively, the data lines DL1, DL2 and DL3 may be irregularly spaced apart from each other in the pixel area PA.

To reduce the parasitic capacitance between the pixel electrodes and the data lines, a structure where the pixel electrodes are partially removed from an area in which the pixel electrodes are overlapped with the data lines has been described. When the display apparatus includes an organic layer as shown in FIG. 4, the parasitic capacitance may be reduced even if the overlapped areas between the pixel electrodes and the data lines are not removed.

Figure 7:
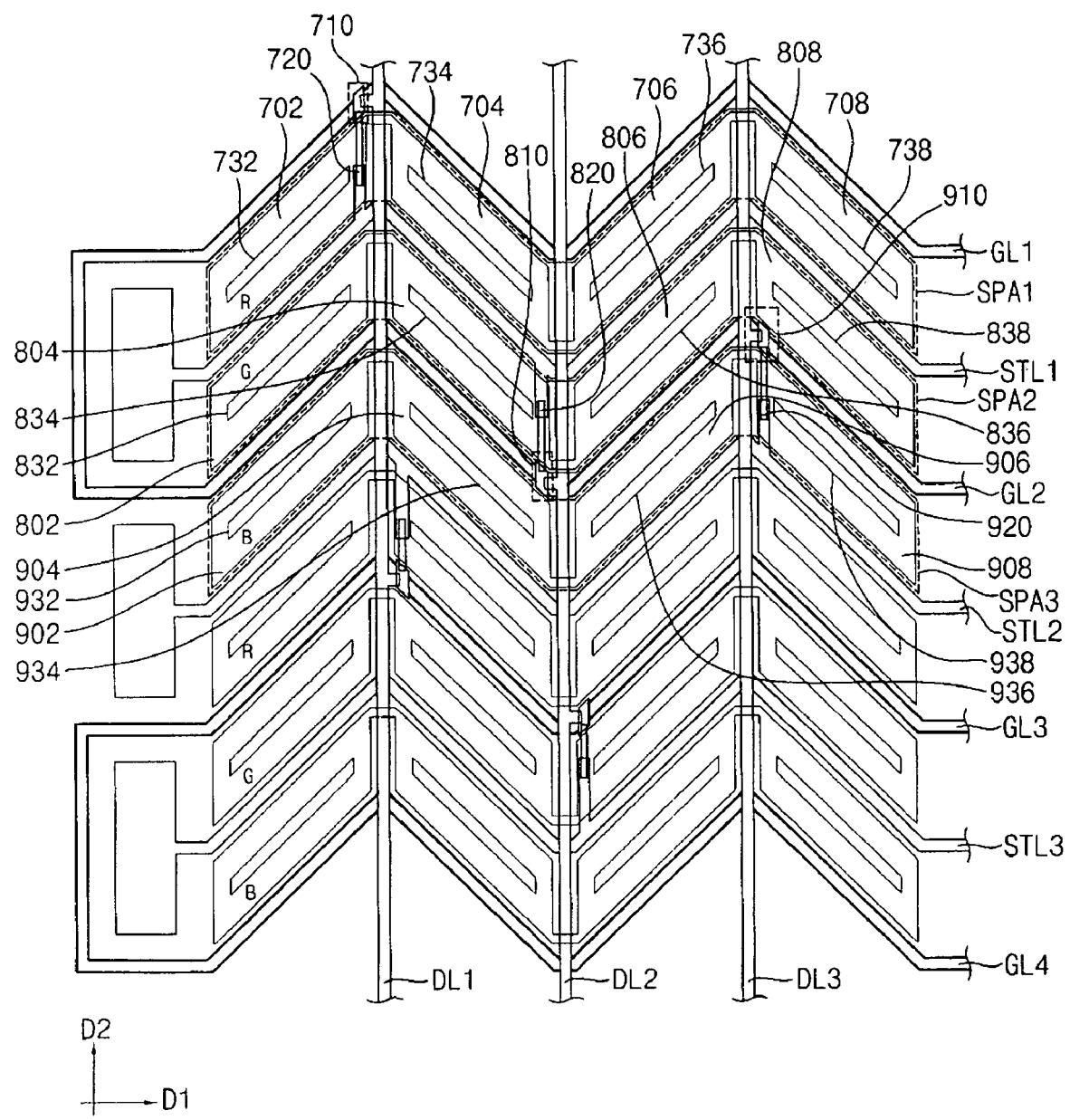
FIG. 7 is a plan view showing a display apparatus according to another exemplary embodiment of the present invention.

FIG. 7 is a plan view showing a display apparatus according to another exemplary embodiment of the present invention. The pixel area PA includes a first sub pixel area SPA1, a second sub pixel area SPA2 and a third sub pixel area SPA3 sequentially arranged in the second direction D2. Each of the first, second and third sub pixel areas SPA1, SPA2 and SPA3 has a "M" shape of which two "V" shapes are arranged next to each other.

The first sub pixel area SPA1 is an area on which a red color is displayed in response to a data signal applied through the second data line DL1, the second sub pixel area SPA2 is a n area on which a green color is displayed in response to the data signal applied through the first data line DL2, and the third sub pixel area SPA3 is an area on which a blue color is displayed in response to the data signal applied through the third data line DL3.

A first pixel electrode and a first TFT 710 are formed in the first sub pixel area SPA1. The first pixel electrode has the "M" shape corresponding to the gate lines GL1, GL2, GL3 and GL4, of which a center portion of the first pixel electrode is bent to the second direction D2.

The first pixel electrode includes a (1-1)-th electrode 702, a (1-2)-th electrode 704, a (1-3)-th electrode 706 and a (1-4)-th electrode 708. The (1-1)-th electrode 702 is symmetrical to the (1-2)-th electrode 704 with reference to the first data line DL1. That is, the (1-1)-th electrode 702 is formed at a left side of the first data line DL1 and the (1-2)-th electrode 704 is formed at a right side of the first data line DL1. The (1-3)-th electrode 706 is symmetrical to the (1-4)-th 708 with reference to the third data line DL3. That is, the (1-3)-th electrode 706 is formed at a left side of the third data line DL3 and the (1-4)-th electrode 708 is formed at a right side of the third data line DL3. The first pixel electrode has a bilateral symmetrical shape with reference to the second data line DL2.

To reduce the parasitic capacitance between the first, second and third data lines DL1, DL2 and DL3, the (1-1)-th electrode 702, the (1-2)-th electrode 704, the (1-3)-th electrode 706 and the (1-4)-th electrode 708 are partially removed from an area where the first, second and third data lines DL1, DL2 and DL3 are overlapped with the (1-1)-th electrode 702, the (1-2)-th electrode 704, the (1-3)-th electrode 706 and the (1-4)-th electrode 708.

The first TFT 710 includes a first gate electrode, a first active pattern, a first source electrode protruded from the first data line DL1 and a first d rain electrode. The first gate electrode is an area of which the first active pattern is overlapped with the first gate line GL1. The first drain electrode is electrically connected to the (1-1)-th electrode 702 through a contact hole (not shown).

The first TFT 710 is operated in response to the gate signal applied from the first gate line GL1, so that the data signal may be applied to the (1-1)-th electrode 702, the (1-2)-th electrode 704, the (1-3)-th electrode 706 and the (1-4)-th electrode 708 through the first data line DL1.

A second pixel electrode and a second TFT 810 are formed in the second sub pixel area SPA2. The second pixel electrode has the "M" shape corresponding to the gate lines GL1, GL2, GL3 and GL4, of which a center portion of the second pixel electrode is bent to the second direction D2.

The second pixel electrode includes a (2-1)-th electrode 802, a (2-2)-th electrode 804, a (2-3)-th electrode 806 and a (2-4)-th electrode 808. The (2-1)-th electrode 802 is formed at a left side of the first data line DL1 and the (2-2)-th electrode 804 is formed at a right side of the first data line DL1. The (2-3)-th electrode 806 is formed at a left side of the third data line DL3 and the (2-4)-th electrode 808 is formed at a right side of the third data line DL3. The second pixel electrode has a bilateral symmetrical shape with reference to the second data line DL2.

To reduce the parasitic capacitance between the first, second and third data lines DL1, DL2 and DL3, the (2-1)-th electrode 802, the (2-2)-th electrode 804, the (2-3)-th electrode 806 and the (2-4)-th electrode 808 are partially removed from an area where the first, second and third data lines DL1, DL2 and DL3 are overlapped with the (2-1)-th electrode 802, the (2-2)-th electrode 804, the (2-3)-th electrode 806 and the (2-4)-th electrode 808.

The second TFT 810 includes a second gate electrode, a second active pattern, a second source electrode protruded from the second data line DL2 and a second drain electrode. The second gate electrode is an area of which the second active pattern is overlapped with the second gate line GL2. The second drain electrode is electrically connected to the (2-2)-th electrode 804 through a contact hole (not shown).

The second TFT 810 is operated in response to the gate signal applied from the second gate line GL2, so that the data signal may be applied to the (2-1)-th electrode 802, the (2-2)-th electrode 804, the (2-3)-th electrode 806 and the (2-4)-th electrode 808 through the second data line DL2. According to an embodiment of the present invention, since the second gate line GL2 is connected to the first gate line GL1, the gate signal from the second gate line GL2 is identical with the gate signal from the first gate line GL1.

A third pixel electrode and a third TFT 910 are formed in the third sub pixel area SPA3. The third pixel electrode has the "M" shape corresponding to the gate lines GL1, GL2, GL3 and GL4, of which a center portion of the second pixel electrode is bent to the second direction D2.

The third pixel electrode includes a (3-1)-th electrode 902, a (3-2)-th electrode 904, a (3-3)-th electrode 906 and a (3-4)-th electrode 908. The (3-1)-th electrode 902 is formed at a left side of the first data line DL1 and the (3-2)-th electrode 904 is formed at a right side of the first data line DL1. The (3-3)-th electrode 906 is formed at a left side of the third data line DL3 and the (3-4)-th electrode 908 is formed at a right side of the third data line DL3. The third pixel electrode has a bilateral symmetrical shape with reference to the second data line DL2.

To reduce the parasitic capacitance between the first, second and third data lines DL1, DL2 and DL3, the (3-1)-th electrode 902, the (3-2)-th electrode 904, the (3-3)-th electrode 906 and the (3-4)-th electrode 908 are partially removed from an area where the first, second and third data lines DL1, DL2 and DL3 are overlapped with the (3-1)-th electrode 902, the (3-2)-th electrode 904, the (3-3)-th electrode 906 and the (3-4)-th electrode 908.

The third TFT 910 includes a third gate electrode, a third active pattern, a third source electrode protruded from the third data line DL3 and a third drain electrode. The third gate electrode is an area of which the third active pattern is overlapped with the second gate line GL2. The third drain electrode is electrically connected to the (3-4)-th electrode 908 through a contact hole (not shown).

The third TFT 910 is operated in response to the gate signal applied from the second gate line GL2, so that the data signal may be applied to the (3-1)-th electrode 902, the (3-2)-th electrode 904, the (3-3)-th electrode 906 and the (3-4)-th electrode 908 through the third data line DL3.

A first storage line STL1 and a second storage line STL2 are formed in the pixel area PA. The first storage line STL1 is formed between the first sub pixel area SPA1 and the second sub pixel area SPA2 and has a same shape as that of the first gate line GL1. The second storage line STL2 is formed between the third sub pixel area SPA3 and a next pixel area and has a same shape as that of the second gate line GL2.

A first storage capacitor 720 is formed in the first sub pixel area SPA1, a second storage capacitor 820 is formed in the second sub pixel area SPA2, and a third storage capacitor 920 is formed in the third sub pixel area SPA3.

According to an embodiment of the present invention, the display apparatus further includes a common electrode (not shown) facing the first, second and third pixel electrodes 700, 800 and 900.

The common electrode corresponding to the first sub pixel area SPA1 is partially removed to form a (1-1)-th opening 732, a (1-2)-th opening 734, a (1-3)-th opening 736 and a (1-4)-th opening 738. The (1-1)-th opening 732 is formed at the center portion of the (1-1)-th electrode 702 and has a corresponding shape to the (1-1)-th electrode 702. The (1-2)-th opening 734 is formed at the center portion of the (1-2)-th electrode 704 and has a corresponding shape to the (1-2)-th electrode 704. The (1-3)-th opening 736 is formed at the center portion of the (1-3)-th electrode 706 and has a corresponding shape to the (1-3)-th electrode 706. The (1-4)-th opening 738 is formed at the center portion of the (1-4)-th electrode 708 and has a corresponding shape to the (1-4)-th electrode 708. Thus, the first sub pixel area SPA1 is divided into eight domains by the (1-1)-th opening 732, the (1-2)-th opening 734, the (1-3)-th opening 736 and the (1-4)-th opening 738.

The common electrode corresponding to the second sub pixel area SPA2 is partially removed to form a (2-1)-th opening 832, a (2-2)-th opening 834, a (2-3)-th opening 836 and a (2-4)-th opening 838. The (2-1)-th opening 832 is formed at the center portion of the (2-1)-th electrode 802 and has a corresponding shape to the (2-1)-th electrode 802. The (2-2)-th opening 834 is formed at the center portion of the (2-2)-th electrode 804 and has a corresponding shape to the (2-2)-th electrode 804. The (2-3)-th opening 836 is formed at the center portion of the (2-3)-th electrode 806 and has a corresponding shape to the (2-3)-th electrode 806. The (2-4)-th opening 838 is formed at the center portion of the (2-4)-th electrode 808 and has a corresponding shape to the (2-4)-th electrode 808. Thus, the second sub pixel area SPA2 is also divided into eight domains by the (2-1)-th opening 832, the (2-2)-th opening 834, the (2-3)-th opening 836 and the (2-4)-th opening 838.

The common electrode corresponding to the third sub pixel area SPA3 is partially removed to form a (3-1)-th opening 932, a (3-2)-th opening 934, a (3-3)-th opening 936 and a (3-4)-th opening 938. The (3-1)-th opening 932 is formed at the center portion of the (3-1)-th electrode 902 and has a corresponding shape to the (3-1)-th electrode 902. The (3-2)-th opening 934 is formed at the center portion of the (3-2)-th electrode 904 and has a corresponding shape to the (3-2)-th electrode 904. The (3-3)-th opening 936 is formed at the center portion of the (3-3)-th electrode 906 and has a corresponding shape to the (3-3)-th electrode 906. The (3-4)-th opening 938 is formed at the center portion of the (3-4)-th electrode 908 and has a corresponding shape to the (3-4)-th electrode 908. Thus, the third sub pixel area SPA3 is also divided into eight domains by the (3-1)-th opening 932, the (3-2)-th opening 934, the (3-3)-th opening 936 and the (3-4)-th opening 938.

Therefore, each of the first, second and third sub pixel areas SPA1, SPA2 and SPA3 is divided into the eight domains, and the liquid crystal molecules in each domains of the first, second and third pixel areas SPA1, SPA2 and SPA3 are vertically aligned in different directions, thereby improving a response speed of the display apparatus. Also, the display apparatus may have an enhanced opening ratio since distances can be increased between the first, second and third pixel electrodes.

The data lines DL1, DL2 and DL3 are formed in the pixel area PA and extended longitudinally in the second direction D2. Particularly, the first data line DL1 is formed between the (1-1)-th electrode 702 and the (1-2)-th electrode 704 and extended to the second direction D2. The second data line DL2 is formed between the (1-2)-th electrode 704 and the (1-3)-th electrode 706 and extended to the second direction D2. The third data line DL3 is formed between the (1-3)-th electrode 706 and the (1-4)-th electrode 708 and extended to the second direction D2.

Thus, the data lines DL1, DL2 and DL3 may have a straight-line shape, so that the data lines DL1, DL2 and DL3 may have a shortened length in comparison with a zigzag shape of the data lines DL1, DL2 and DL3, thereby preventing the delay of the data signal through the data lines DL1, DL2 and DL3.

When an electric field is formed between the (1-1)-th electrode 702, the (1-2)-th electrode 704, the (1-3)-th electrode 706 and the (1-4)-th electrode 708, a texture occurs since the liquid crystal molecules are aligned in different directions. However, the data lines DL1, DL2 and DL3 are formed at positions where the texture occurs, so that the display apparatus may prevent the deterioration of the opening ratio.

Figure 8:
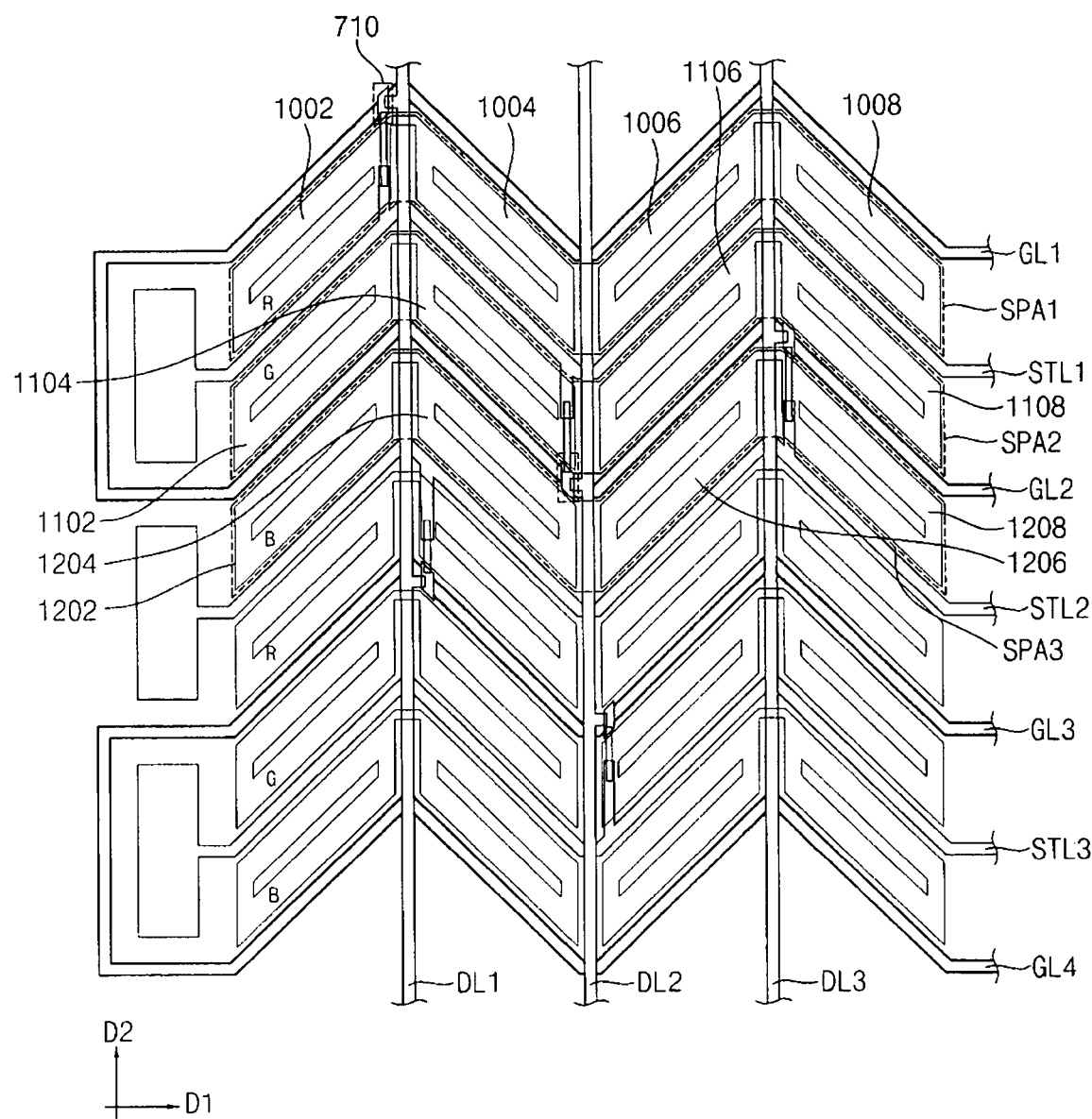
FIG. 8 is a plan view showing a display apparatus according to another exemplary embodiment of the present invention.

FIG. 8 is a plan view showing a display apparatus according to another exemplary embodiment of the present invention. In FIG. 8, the display apparatus has the same structure and function as those of the display device in FIG. 7 except for a pixel electrode. Also, the same reference numerals denote the same elements in FIG. 7, and thus any further repetitive descriptions of the same elements will be omitted.

Referring to FIG. 8, a pixel area PA of a display apparatus according to another exemplary embodiment of the present invention includes a first sub pixel area SPA1, a second sub pixel area SPA2 and a third sub pixel area SPA3.

In the first sub pixel area SPA1, a (1-1)-th electrode 1002, a (1-2)-th electrode 1004, a (1-3)-th electrode 1006 and a (1-4)-th electrode 1008 are divided into two parts with reference to the second data line DL2. Thus, the (1-1)-th electrode 1002 and the (1-2)-th electrode 1004 formed at a left side of the second data line DL2 are connected to each other and operated as a main electrode. The (1-3)-th electrode 1006 and the (1-4)-th electrode 1008 formed at a right side of the second data line DL2 are connected to each other and operated as a sub electrode. The main electrode may receive the data signal having a same voltage level as the data signal applied to the sub electrode, or a different voltage level from the data signal applied to the sub electrode.

To apply the different voltages to the main electrode and the sub electrode, the main electrode and the sub electrode are each electrically connected to a different thin film transistor. The sub electrode is formed with a parasitic capacitor to receive the data signal through the main electrode, so that the data signal having a lower voltage level than the data signal applied to the main electrode may be applied to the sub electrode.

As described above, when the data signals having the different voltage levels are applied to the main electrode and the sub electrode, the main electrode may have a different voltage transmittance (gamma curve) from the voltage transmittance of the sub electrode, thereby improving visibility of the display apparatus.

The second pixel electrode and the third electrode formed in the second sub pixel area SPA2 and the third sub pixel area SPA3 are divided into two parts with reference to the second data line DL2. That is, the (2-2)-th electrode 1104 and the (2-3)-th electrode 1106 in the second sub pixel area SPA2 are spaced apart from each other. The (3-2)-th electrode 1204 and the (3-3)-th electrode 1206 in the third sub pixel area SPA3 are also divided into two parts with reference to the second data line DL2. Thus, each of the second and third sub pixel areas SPA2 and SPA3 has a main electrode and a sub electrode with reference to the second data line DL2.

Figure 9:
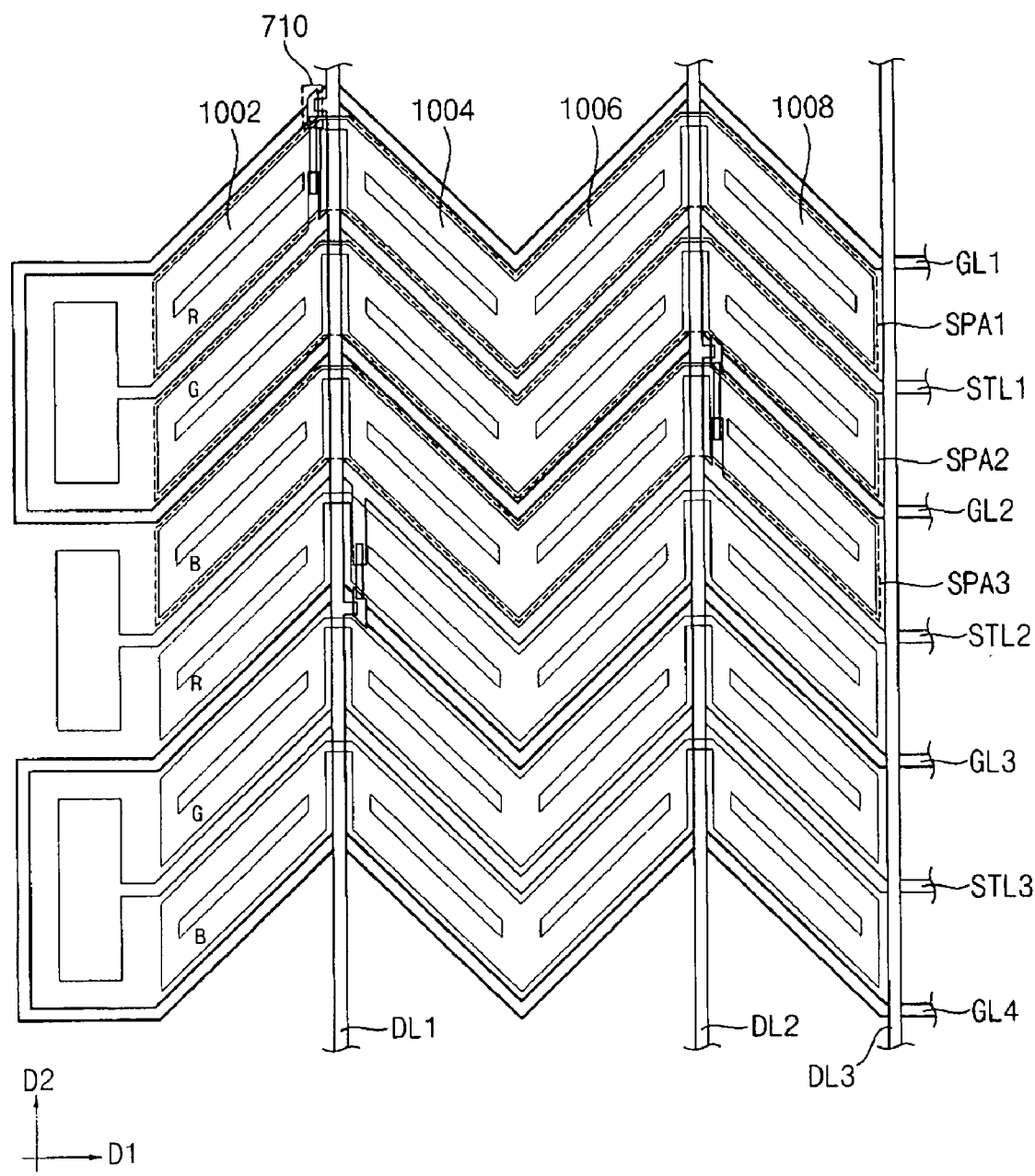
FIG. 9 is a plan view showing a display apparatus according to another exemplary embodiment of the present invention.

FIG. 9 is a plan view showing a display apparatus according to another exemplary embodiment of the present invention. In FIG. 9, the display apparatus has the same structure and function as those of the display device in FIG. 7 except for a pixel electrode. A pixel area PA of a display apparatus according to another exemplary embodiment of the present invention includes a first sub pixel area SPA1, a second sub pixel area SPA2 and a third sub pixel area SPA3.

The first sub pixel area SPA1 includes a (1-1)-th electrode 1002, a (1-2)-th electrode 1004, a (1-3)-th electrode 1006 and a (1-4)-th electrode 1008. The (1-1)-th electrode 1002 is partially connected to the (1-2)-th electrode 1004, and the (1-2)-th electrode 1004 is wholly connected to the (1-3)-th electrode 1006. The (1-3)-th electrode 1006 is partially connected to the (1-4)-th electrode 1008.

The second and third sub pixel areas SPA2 and SPA3 have the same function and structure as those of the first sub pixel area SPA1. The data lines DL1, DL2 and DL3 are formed in an area on which a texture occurs in the pixel area PA. That is, the first data line DL1 is formed between the (1-1)-th electrode 1002 and the (1-2)-th electrode 1004 and extended to the second direction D2. The second data line DL2 is formed between the (1-3)-th electrode 1006 and the (1-4)-th electrode 1008 and extended to the second direction D2. The third data line DL3 is formed between the (1-4)-th electrode 1008 and a pixel area of a next stage and extended to the second direction D2. Thus, the data lines DL1, DL2 and DL3 are formed at positions where the texture occurs, so that the display apparatus may prevent the deterioration of the opening ratio.

Figure 10A:
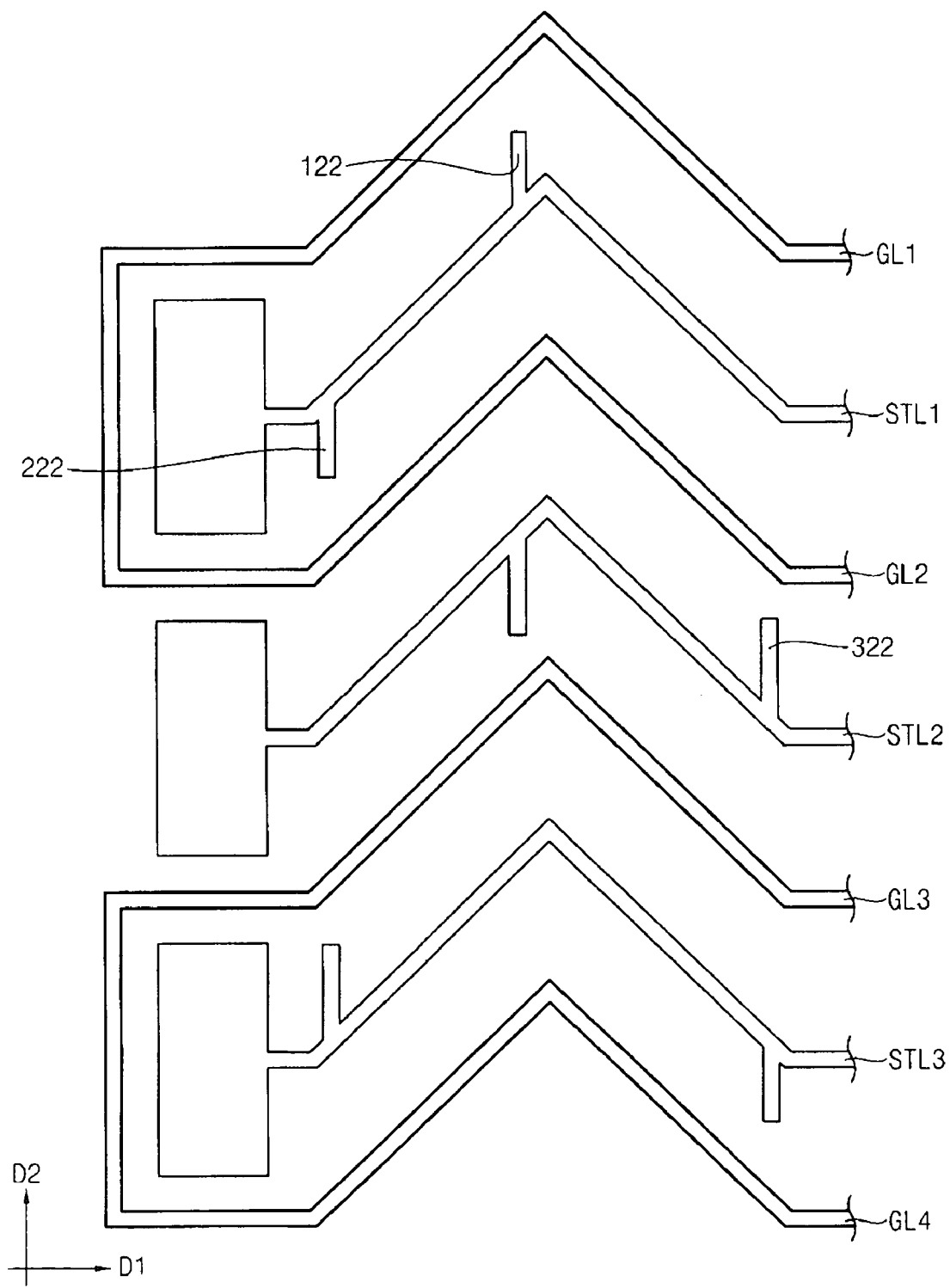
FIGS. 10A to 10D are views illustrating a method of manufacturing a display apparatus.

FIGS. 10A to 10D are views illustrating a method of manufacturing a display apparatus shown in FIG. 1. Referring to FIG. 10A, a first conductive thin film layer is formed on the display substrate 400 (refer to FIG. 2), and the first conductive thin film layer is patterned using an etching mask to form the gate lines GL1, GL2, GL3 and GL4. The gate lines GL1, GL2, GL3 and GL4 have a zigzag shape of which a plurality of V shapes are arranged next to each other in the first direction D1. Two adjacent gate lines are electrically connected to each other through ends of the two adjacent gate lines. That is, the end of the first gate line GL1 is electrically connected to the end of the second gate line GL2, and the end of the third gate line GL3 is electrically connected to the end of the fourth gate line GL4.

When the gate lines GL1, GL2, GL3 and GL4 are formed in the pixel area PA, the first storage line STL1 and the storage line STL2 having a same shape as the gate lines GL1, GL2, GL3 and GL4 are formed in the pixel area PA. That is, the first storage line STL1 is formed between the first gate line GL1 and the second gate line GL2, and the second storage line STL2 is formed between the second gate line GL2 and the third gate line GL3.

To form a first storage capacitor 120, a second storage capacitor 220 and a third storage capacitor 320, a first electrode 122, a second electrode 222 and a third electrode 322 are protruded and extended from the first and second storage lines STL1 and STL2.

Figure 10B:
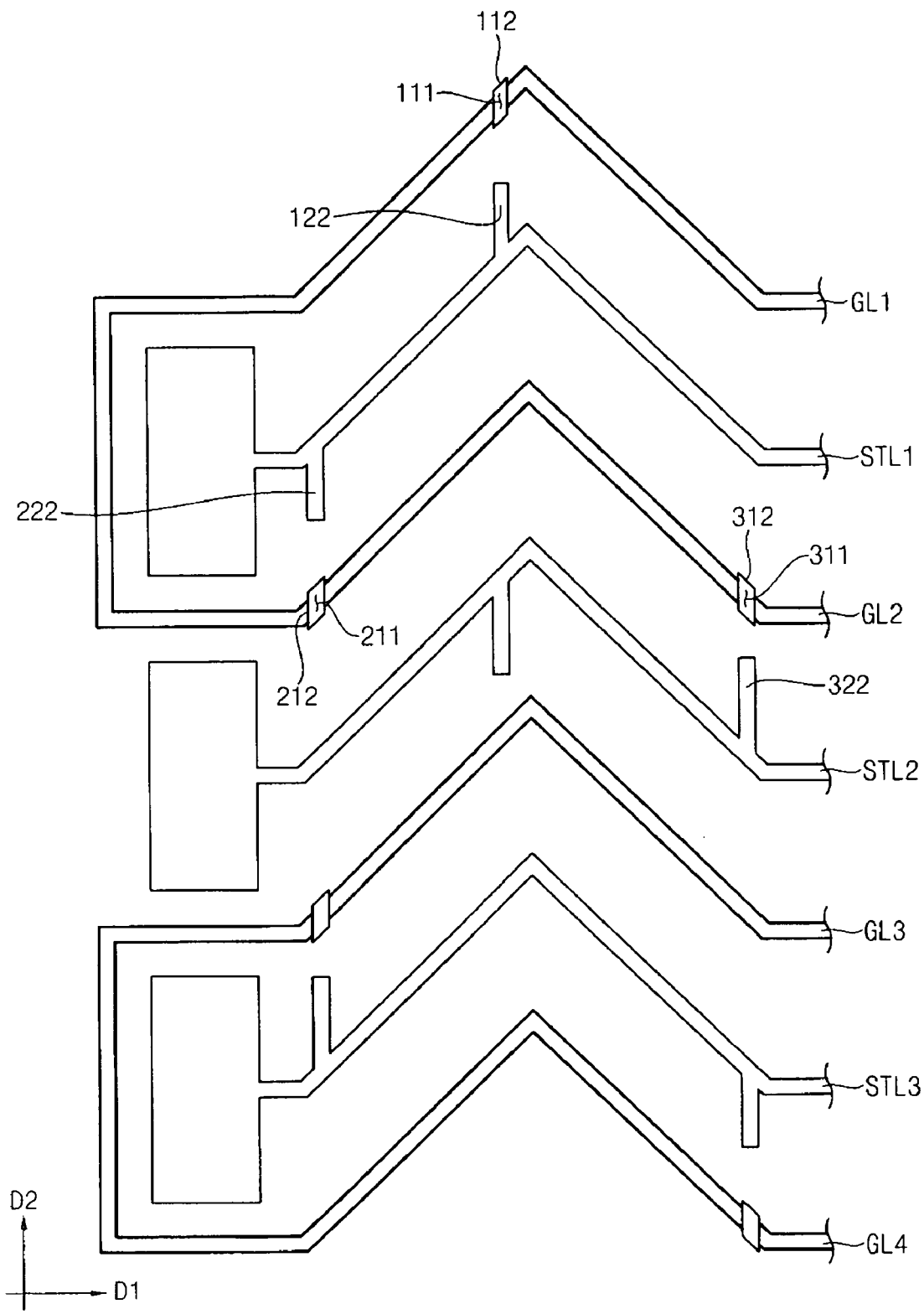

Referring to FIG. 10B, a semiconductor layer is formed on the display substrate 400 on which the gate lines GL1, GL2, GL3 and GL4 are formed, and the semiconductor layer is etched to form the first, second and third active patterns 112, 212 and 312 for the first, second and third TFTs 110, 210 and 310. The first active pattern 112 is formed on a portion on the first gate line GL1, and the second and third active patterns 212 and 312 are formed on a portion of the second line GL2.

An area where the first gate line GL1 is overlapped with the first active pattern 112 is defined as the first gate electrode 111. An area where the second gate line GL2 is overlapped with the second active pattern 212 is defined as the second gate electrode 211. An area where the second gate line GL2 is overlapped with the third active pattern 312 is defined as the third gate electrode 311.

Figure 10C:
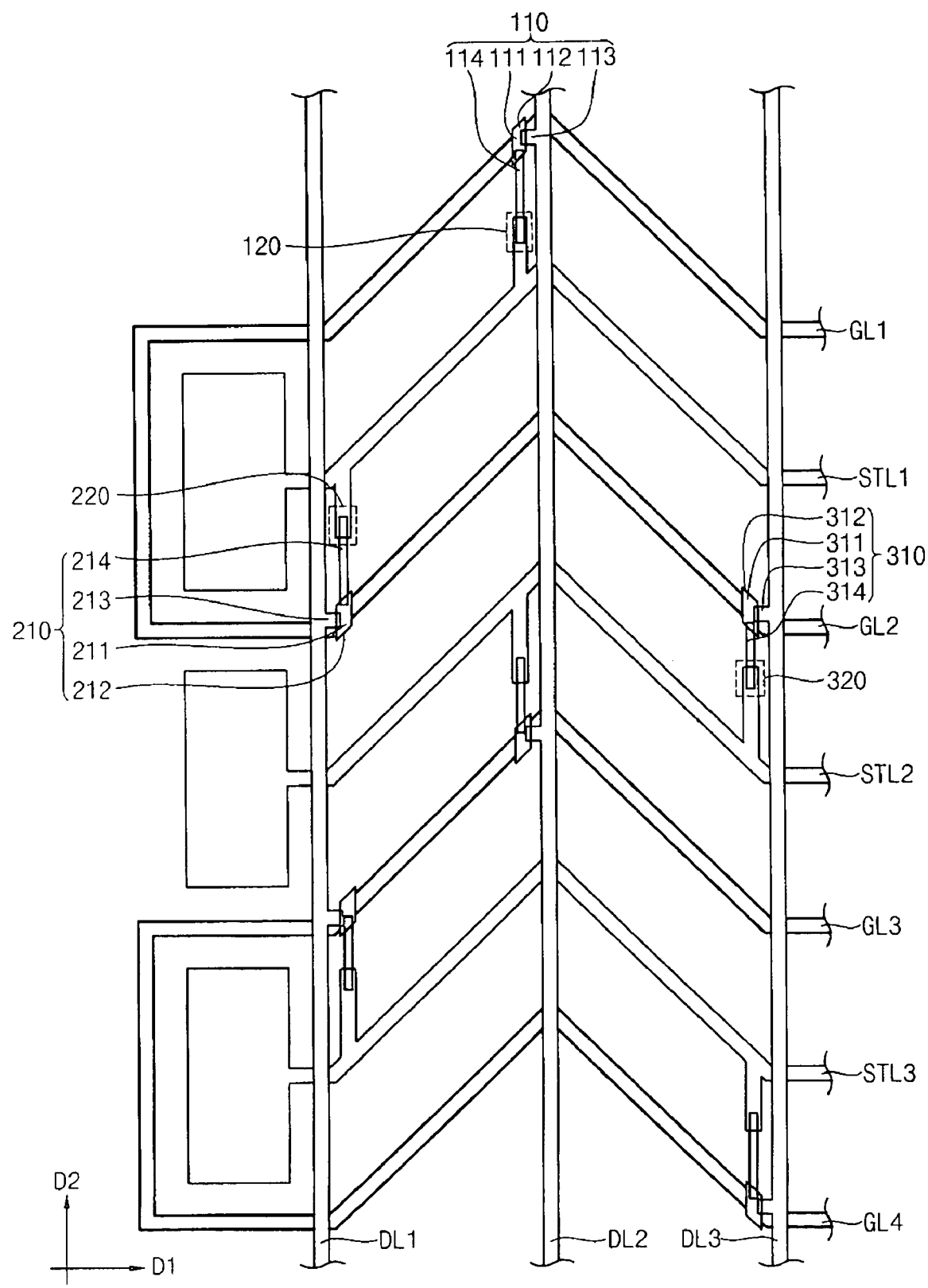

Referring to FIG. 10C, a second conductive thin film layer is formed on the display substrate 400 on which the first, second and third active patterns 112, 212 and 312. The second conductive thin film layer is etched using a mask to form the data lines DL1, DL2 and DL3. The data lines DL1, DL2 and DL3 intersect with the gate lines GL1, GL2, GL3 and GL4 and are extended longitudinally in the second direction D2. Thus, the data lines DL1, DL2 and DL3 may have a straight-line shape, so that the data lines DL1, DL2 and DL3 may have a shorter length in comparison with the zigzag shape, thereby preventing the delay of the data signal through the data lines DL1, DL2 and DL3.

The first, second and third source electrodes 113, 213 and 313, and the first, second and third drain electrodes 114, 214 and 314 protruded from the data lines DL1, DL2 and DL3 are formed when the data lines DL1, DL2 and DL3 are formed. The first, second and third drain electrodes 114, 214 and 314 are partially overlapped with the first, second and third electrodes 112, 212 and 312, thereby forming the first, second and third storage capacitor 120, 220 and 320.

Figure 10D:
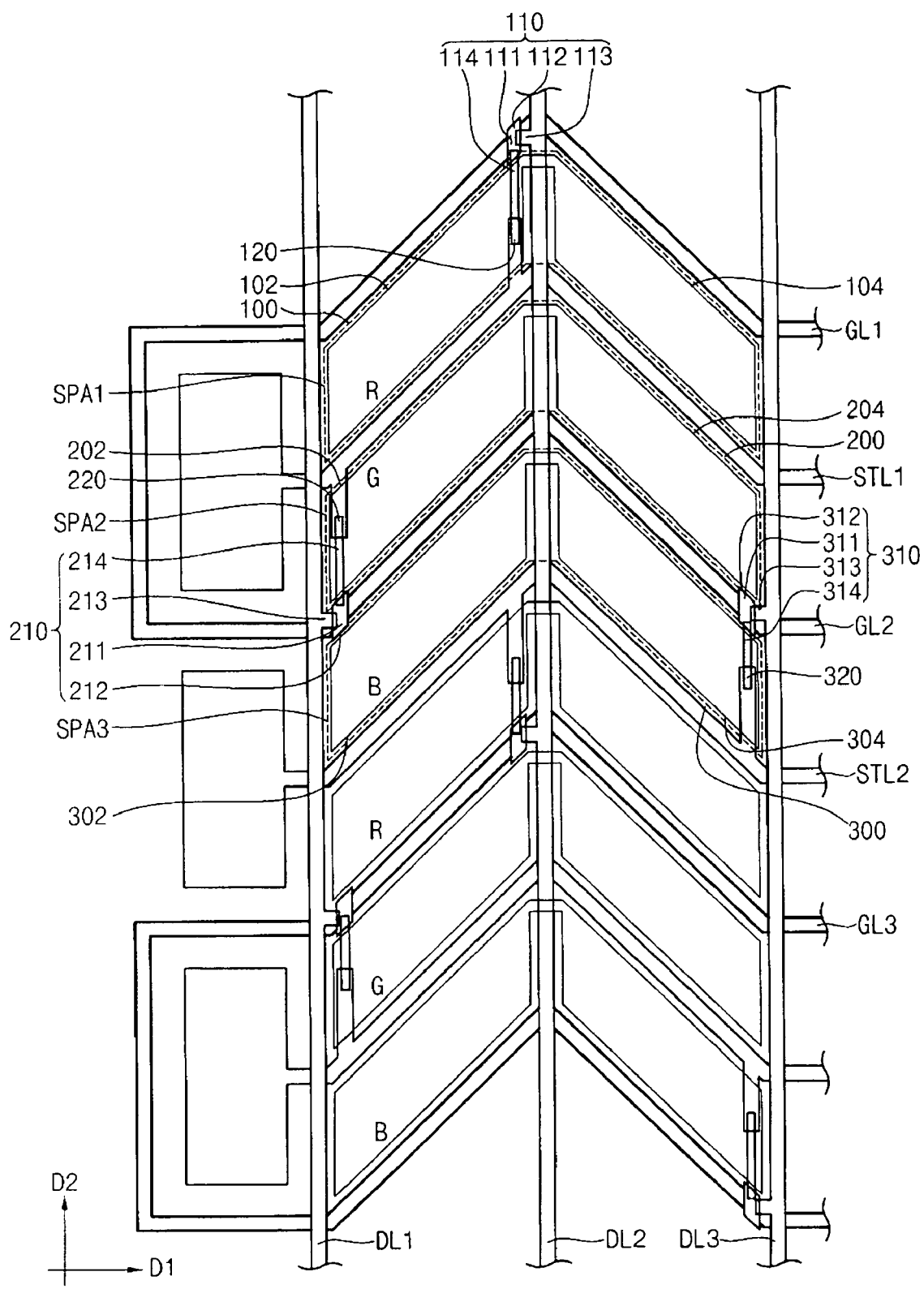

Referring to FIG. 10D, a passivation layer 410 (FIG. 2) is formed on the display substrate 400 on which the data lines DL1, DL2 and DL3 are formed. When a transparent conductive thin film layer is formed on the display substrate 400, on which the passivation layer 410 is formed and patterned, the first, second and third pixel electrodes 100, 200 and 300 are formed in the pixel area PA. The first pixel electrode 100 includes the (1-1)-th electrode 102 and the (1-2)-th electrode 104, the second pixel electrode 200 includes the (2-1)-th electrode 202 and the (2-2)-th electrode 204, and the third pixel electrode 300 includes the (3-1)-th electrode 302 and the (3-2)-th electrode 304. According to an embodiment of the present invention, to reduce the parasitic capacitance between the first, second and third pixel electrodes 100, 200 and 300 and the data lines DL1, DL2 and DL3, the first, second and third pixel electrodes 100, 200 and 300 are removed from the overlapped areas where the data lines DL1, DL2 and DL3 are overlapped with the first, second and third pixel electrodes 100, 200 and 300. When the organic layer 440 (FIG. 4) is formed on the passivation layer 410, the first, second and third electrodes 100, 200 and 300 are not removed from the overlapped areas since the parasitic capacitance between the first, second and third pixel electrodes 100, 200 and 300 and the data lines DL1, DL2 and DL3 may be reduced due to the organic layer 440.

According to the above, the display apparatus has the gate lines having the zigzag shape and the data lines extended longitudinally allowing the data lines to intersect with the gate lines. The pixel electrode formed in the pixel area defined by the gate lines and the data lines have the V shape or the M shape. The pixel electrode is partially removed from the area where the pixel electrode is overlapped with the data lines.

Thus, the data lines may have the straight-line shape, so that the data lines may have the shortened length in comparison with the zigzag shape of the data lines, thereby preventing the delay of the data signal through the data lines.

Although preferred embodiments have been described with reference to the accompanying drawings, it is to be understood that the present invention is not limited to these precise embodiments but various changes and modifications can be made by one skilled in the art without departing from the spirit and scope of the present invention. All such changes and modifications are intended to be included within the scope of the invention as defined by the appended claims.

What is claimed is:

1. A display apparatus comprising:
    a plurality of pixel areas, each defined by gate lines and data lines, wherein the data lines are arranged with the gate lines forming an angular relationship with the data lines; and
    a plurality of pixel electrodes formed in the pixel areas and configured to be essentially parallel with the arrangement of the gate lines,
    wherein the gate lines form a zigzag pattern so that a pixel area has a V shape, and
    wherein a data line passes though a center portion of the V shared pixel area.

2. The display apparatus of claim 1, wherein each pixel electrode has a bilateral symmetrical shape and is divided into a plurality of domains.

3. The display apparatus of claim 2, wherein the data lines extend along a longitudinal axis and a center portion of each pixel electrode is disposed along a longitudinal axis in substantial parallel relativity with the longitudinal axis of the data lines.

4. The display apparatus of claim 3, wherein two adjacent gate lines are electrically connected to each other.

5. The display apparatus of claim 1, wherein each pixel electrode has a V shape.

6. The display apparatus of claim 1, wherein the pixel area comprises a first sub pixel area, a second sub pixel area and a third sub pixel area sequentially arranged along the longitudinal axis of a data line.

7. The display apparatus of claim 6, wherein a (3n-2)-th data line of the data lines is formed at a position adjacent to a first end portion of the first, second and third sub pixel areas, a (3n-1)-th data line of the data lines is formed at a center portion of the first, second and third sub pixel areas, and a (3n)-th data line of the data lines is formed at a position adjacent to a second end portion of the first, second and third sub pixel areas, where "n" is a natural number.

8. The display apparatus of claim 7, wherein each pixel electrode comprises:
    a first electrode formed at a left side of the (3n-1)-th data line; and
    a second electrode formed at a right side of the (3n-1)-th data line,
    the first and second electrodes are substantially linearly symmetrical with each other with reference to the (3n-1)-th data line, and the first and second electrodes are partially electrically connected to each other in an area where the first and second electrodes are overlapped with the (3n-1)-th data line.

9. The display apparatus of claim 8, further comprising a switching device to apply a data signal from the data lines to the first electrode and the second electrode.

10. The display apparatus of claim 7, wherein each pixel electrode comprises:
    a first electrode formed at a left side of the (3n-1)-th data line; and
    a second electrode formed at a right side of the (3n-1)-th data line,
    wherein the first and second electrodes are substantially linearly symmetrical with each other with reference to the (3n-1)-th data line, and
    wherein the first and second electrodes are separated from each other.

11. The display apparatus of claim 10, further comprising a first switching device and a second switching device to apply a data signal from the data lines to the first electrode and the second electrode, respectively.

12. The display apparatus of claim 6, wherein a (3n-1)-th data line of the data lines is formed at a center position of the first, second and third sub pixel areas, a (3n-2)-th data line of the data lines is formed between the (3n-1)-th data line and a first end portion of the first, second and third sub pixel areas, and a (3n)-th data line of the data lines is formed between the (3n-1)-th data line and a second end portion of the first, second and third sub pixel areas, where "n" is a natural number.

13. A display apparatus comprising:
a plurality of pixel areas, each defined by gate lines and data lines, wherein the data lines are arranged with the gate lines forming an angular relationship with the data lines; and
a plurality of pixel electrodes formed in the pixel areas and configured to be essentially parallel with the arrangement of the gate lines;
wherein the gate lines form a zigzag pattern, and each pixel electrode extends along an adjacent gate line so that each pixel electrode has an M shape.

14. The display apparatus of claim 13, wherein the pixel area comprises a first sub pixel area, a second sub pixel area and a third sub pixel area.

15. The display apparatus of claim 13, wherein each pixel electrode comprises:
a main electrode formed at a left side with respect to a center portion of each pixel electrode; and
a sub electrode formed at a right side with respect to the center portion of each pixel electrode.

16. The display apparatus of claim 15, wherein the main electrode comprises a first electrode and a second electrode substantially linearly symmetrical with each other, and the sub electrode comprises a third electrode and a fourth electrode substantially linearly symmetrical with each other.

17. The display apparatus of claim 16, wherein a (3n-1)-th data line of the data lines is formed between the second electrodes and the third electrodes, a (3n-2)-th data line of the data lines is formed between the first electrode and the second electrode, and a (3n)-th data line of the data lines is formed between the third electrode and the fourth electrode, where "n" is a natural number.

18. The display apparatus of claim 17, wherein the first, second, third and fourth electrodes are partially removed from areas where the first, second, third and fourth electrodes are overlapped with the data lines.

19. The display apparatus of claim 18, further comprising a switching device to apply a data signal from the data lines to the first, second, third and fourth electrodes.

20. The display apparatus of claim 17, wherein the first electrode and the second electrode are partially connected to each other in an area where the first and second electrodes are overlapped with the data lines, the third electrode and the fourth electrode are partially connected to each other in an area where the third and fourth electrodes are overlapped with the data lines, and the second electrode and the third electrode are separated from each other.

21. The display apparatus of claim 17, wherein the first electrode and the second electrode are partially connected to each other in an area where the first and second electrodes are overlapped with the data lines, the third electrode and the fourth electrode are partially connected to each other in an area where the third and fourth electrodes are overlapped with the data lines, and the second electrode and the third electrode are integrally formed with each other.

22. The display apparatus of claim 16, wherein a (3n-2)-th data line of the data lines is formed between the first electrode and the second electrode, a (3n-1)-th data line of the data lines is formed between the third electrode and the fourth electrode, and a (3n)-th data line of the data lines is formed at a position adjacent to an end portion of the fourth electrode, where "n" is a natural number.

23. A method of manufacturing a display apparatus, comprising:
forming a plurality of gate lines on a substrate, wherein two adjacent gate lines are electrically connected to each other;
forming a plurality of data lines extended longitudinally such that the data lines form an angular relationship with the gate lines,
wherein the gate lines and the data lines define a plurality of pixel areas; and
forming a plurality of pixel electrodes in the pixel areas to be essentially parallel with the gate lines,
wherein the gate lines form a zigzag pattern so that a pixel area has a V shape, and
wherein a data line passes through a center portion of the V shared pixel area.

* * * * *